United States Patent [19]

Blaker

[11] Patent Number: 5,425,055
[45] Date of Patent: Jun. 13, 1995

[54] DIGITAL RADIO MODULATOR

[75] Inventor: David M. Blaker, Philadelphia, Pa.

[73] Assignee: Nokia Mobile Phones (UK) Limited, Camberley, United Kingdom

[21] Appl. No.: 980,541

[22] Filed: Nov. 23, 1992

[30] Foreign Application Priority Data

Nov. 30, 1991 [GB] United Kingdom .................. 9125577

[51] Int. Cl.$^6$ ...................... H04L 27/18; H04L 27/20; H04L 27/22
[52] U.S. Cl. ...................................... 375/279; 375/310; 375/329; 332/103; 329/304
[58] Field of Search ........................ 375/39, 59, 78, 67, 375/52, 75, 47, 62, 64, 83, 88, 90, 44; 329/300, 304, 306; 332/100, 103

[56] References Cited

U.S. PATENT DOCUMENTS

| | | | |
|---|---|---|---|
| 4,100,369 | 7/1978 | Stenstrom et al. | 375/67 |
| 4,134,072 | 1/1979 | Bolger | 375/67 |
| 4,550,292 | 10/1985 | Smith | 331/2 |
| 4,584,541 | 4/1986 | Nossen | 332/16 R |
| 4,680,556 | 7/1987 | Nakamura et al. | 332/16 R |
| 4,962,510 | 10/1990 | McDavid et al. | 375/83 |

OTHER PUBLICATIONS

Patent Abstracts of Japan, vol. 5, No. 19, 4 Feb. 1981 & JP-A-55147060 (Nippon Denki) 15 Nov. 1980.
11th Annual IEEE Gallium Arsenide Integrated Circuit Symposium, 22–25 Oct. 1989, San Diego, Calif., pp. 49–52, La Macchia M.P. et al. "Flight GaAs Numerically Controlled Oscillator".

*Primary Examiner*—Stephen Chin
*Assistant Examiner*—Tesfaldet Bocure
*Attorney, Agent, or Firm*—Perman & Green

[57] ABSTRACT

A radio modulator/demodulator particularly suitable for TDMA mobile telephone use employs digital techniques for GMSK phase modulation. Phase numbers representative respectively of an intermediate frequency carrier and modulation symbols are combined digitally to combination phase numbers which are subjected to a single folded cosine table to produce a digital trignometric sequence of numbers for modulating the transmitter. Economy of components and memory is achieved and some of the modulator components are used in demodulation which is effected by the single look-up table used in sine and cosine mode alternately.

8 Claims, 2 Drawing Sheets

DIGITAL RADIO MODULATOR

BACKGROUND OF THE INVENTION

1. Field of the Invention

The invention relates to a digital radio modulator and in particular a phase modulator.

2. Description of the Prior Art

Direct digital modulation techniques have the advantage of eliminating a number of analogue components which are inherently less accurate than digital components and more susceptible to changes in characteristics because of temperature changes and ageing.

Phase modulation can be effected by synthesising separate in-phase and quadrature (sine and cosine) components of (a) intermediate frequency (IF) carrier signals and (b) modulation signals; mixing respective carrier and modulation signals; and summing the mixer outputs. This is an established analogue technique and proposals have been made to use a precisely analogous digital technique—see for example EP-A-0377180.

Such a system, however, requires high speed high capacity digital storage and processing with consequently many integrated circuit chips. Chip count can be reduced by very large scale integrated circuit (VLSI) techniques. An example of progress in this direction is described in U.S. Pat. No. 5,008,900 where a finite impulse response (FIR) chip is used in conjunction with a digital intermediate frequency (DIF) chip to perform digital IF synthesis and modulation. Again, however, the in-phase and quadrature components for the IF and modulating signals are derived and applied to a modulator in a manner analogous to the analogue process. Thus, the requirement for digital memory capacity is hardly reduced and the VLSI chips are very expensive. The present invention provides an improvement.

SUMMARY OF THE INVENTION

According to one aspect of the invention there is provided a digital radio phase modulator comprising a digital carrier phase generator for generating a sequence of IF phase numbers which together synthesise an intermediate carrier frequency signal; a modulator phase generator which receives digital modulator data symbols and which generates corresponding modulator phase numbers; an arithmetic-logic unit which combines the IF phase numbers with the modulation phase numbers to produce a sequence of combination phase numbers; a look-up table which determines the sines and/or cosines of the combination phase numbers to give a trigonometric digital output and a digital to analogue convertor for converting the trigonometric digital output to analogue form. It is to be understood that the trigonometric digital output may be the sines or the cosines or a combination of sines and cosines of the combination phase numbers.

The arrangement of the invention takes advantage of the flexibility of digital manipulation to combine the carrier and modulation signals before trignometric conversion. Thus, separate conversion of the IF and modulation signals is not required and significant savings in components can be achieved. Also, because of the combination of phase numbers before trignometric conversion it is possible to synthesise the modulated signal from the cosine or sine conversion products alone.

Thus, a single look-up table can be provided and in the embodiment of the invention to be described, this will be a cosine table. It will be appreciated, however, that a sine table can be used in an equivalent manner. Not only is a single look-up table provided but also a "folding" technique is preferably adopted whereby it is necessary to store only the cosines of one quadrant, for example 0° to 90°. Thus, preferably there is provided a register arrangement which takes the combination phase numbers and which increments or decrements, by a number corresponding to 90°, a phase offset which is added to the combination phase numbers. The modulus of the combination phase numbers is preferably such that 0°; 90°; 180° and 270° are represented in the two most significant bits (MSBs) of the number applied to the look-up table by 00; 01; 10 and 11 respectively. Preferably the MSBs are used to control negation of the table input and output according to the quadrant in which the phase angle lies. A preferred feature of the cosine look-up table is that its output is in a least significant bit (LSB) biased 2's complement format. In other words, there is an implicit ½ LSB added to each value at the output. This reduces the capacity required of the look-up table in terms of bits per word and fully utilises the digital to analogue convertor.

The modulation phase generator is programmed to provide modulation phase numbers having regard to the data symbols and in accordance with a particular modulation scheme. Any phase modulator scheme can be used—for example, phase or Frequency Shift Keying (FSK) and in particular Minimum Shift Keying (MSK) and preferably Gaussian Minimum Shift Keying (GMSK). Typically such systems produce several differently phased samples for each data symbol. Therefore, there is a sampling rate which is a multiple of the data symbol rate and the phase number rates correspond to the sampling rate.

The invention further provides a method of digital radio phase demodulation using components of the above-described modulator.

In using the modulator as a demodulator a digital signal is derived from the received radio signal by a sampling analogue-to-digital convertor. The modulation phase generator is set to produce zero output and the intermediate frequency carrier signal from the carrier phase generator, before application to the look-up table, is alternately switched, at the sampling frequency, between in-phase and quadrature components. The cosine table consequently gives alternate sine and cosine outputs and this is multiplied in a multiplier by the output from the A/D convertor. The output from the multiplier is applied to an image rejection/selectivity digital filter and the output of the filter constitutes the received data symbols.

The invention is applicable to a time division multiple access (TDMA) system. This requires pulsed operation of the transmitter to give bursts of transmission corresponding to respective time slots. The intermittent operation of the transmitter causes spectral widening. In order to alleviate this it is proposed to amplitude modulate the output from the look-up table in the transmission mode. The amplitude modulation is such as to increase the amplitude of the signal progressively at the start of a burst and decrease it progressively at the end of the burst.

The invention has application in mobile radio application and particularly, for example, in radio telephones. A difficulty in such systems is to maintain frequency registration of the transmit and receive frequencies of the mobile station with those of the base station. Conventional techniques apply a control signal to a voltage controlled crystal oscillator (VCXO). This has practical disadvantages and a feature of the invention provides an improvement.

Thus, a preferred feature of the present invention is to provide digital control of the transmit/receive frequency in response to a frequency error signal, the control being effected by generating a sequence of frequency shift phase numbers; and combining the frequency shift phase numbers with the IF phase or modulation phase numbers, the frequency shift phase numbers being calculated to produce, at the intermediate frequency, a phase shift pattern equivalent to a compensatory shift in frequency at the transmit frequency.

With the arrangement described the transmitter frequency is effectively changed via the modulator without "pulling" a crystal oscillator. The control operation is entirely digital, making use of a digital error signal and frequency control is predictably linear.

BRIEF DESCRIPTION OF THE DRAWING

The invention will further be described with reference to the accompanying drawings, of which.

DESCRIPTION OF THE PREFERRED EMBODIMENTS

Figure 1:
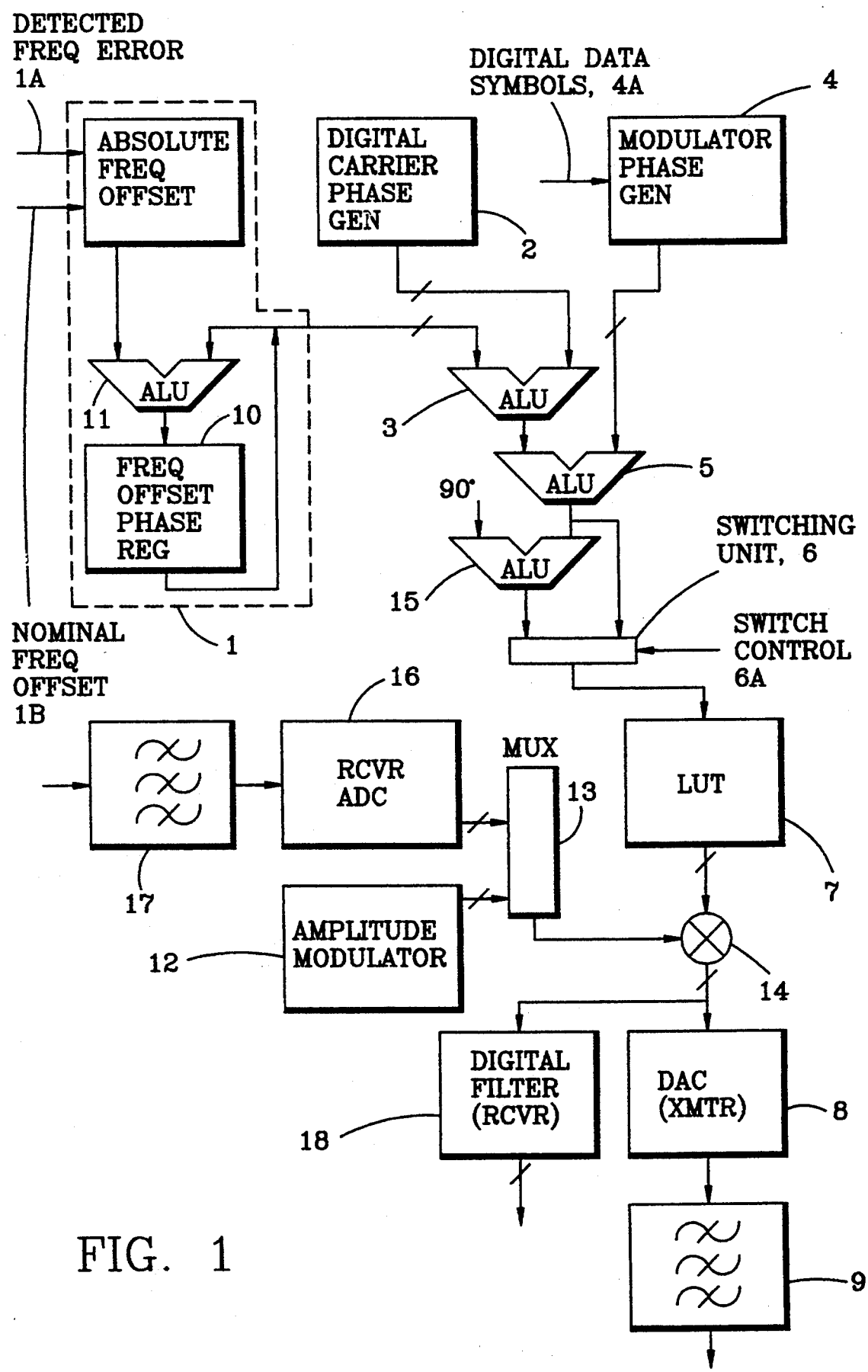
FIG. 1 is a block schematic drawing of a modulator/demodulator in accordance with the invention.

Referring to FIG. 1 there is shown a digital modulator/demodulator for a Groupe Speciale Mobile (GSM) radio telephone system which uses TDMA and is modulated in GMSK. A 1MHz digital carrier phase generator 2 is provided. The system has a clock which runs at 13/3 MHz. Therefore, the carrier phase repeats every 13 clock cycles, every 13 clock cycles being exactly 3 cycles of the 1 MHz carrier. The phase generator 2 generates a series of phase numbers which digitally represent the carrier. The calculations are effected with 12-bit accuracy, the bits representing a binary fraction of 360°, or one cycle. The carrier phase generator applies its output to an arithmetic logic unit (ALU) 3.

A modulation phase generator 4 calculates the phase of the modulation, based on digital data symbols applied at 4a. The ratio of system clock to symbol rate is exactly 16, and the modulation phase generator 4 outputs 16 phase values for every symbol, phase calculations being effected at the clock frequency. The modulation in this system is Gaussian Minimum Shift Keying (GMSK). The modulation phase generator 4 uses a 4T (4 data symbol period) window for calculating the phase. All possible values of modulation phase are stored in a table and addressed by a shift register which holds four symbols, and a 4-bit counter counting 16 time steps per symbol. This implies that there are $2^4 * 2^4 = 2^8 = 256$ values in the table. The outputs from the modulation phase generator 4 and the ALU 3 are applied to the input of another ALU 5 where they are summed. In the modulation phase generator 4, as each symbol is shifted off the end of a shift register, it contributes ±90° to a 2-bit accumulator which accumulates units of 90°. The values for the window are symmetrically distributed about t=0, so that the window is symmetrical above and below each symbol. There is a two symbol delay in the modulation phase generator 4 which is one-half the 4T window.

A cosine look-up table (LUT) 7 converts the 12-bit phase into an 8-bit number which drives a D/A converter 8. The output of the LUT is in an LSB-biased 2's-complement format. That is, there is an implicit ½ Least Significant Bit (LSB) added to each value at the output. Therefore, instead of an 8-bit value whose range is −128 to +127, the range of the output is −127.5 to +127.5. This is useful, because it means that all 256 output values of the D/A converter are used, without clipping or losing one of the values. This means also that 0 is not a value that is possible. Only +0.5 or −0.5 LSB are possible. The output of the D/A converter is applied to a filter 9 and thence to the transmitter (not shown).

Figure 2:
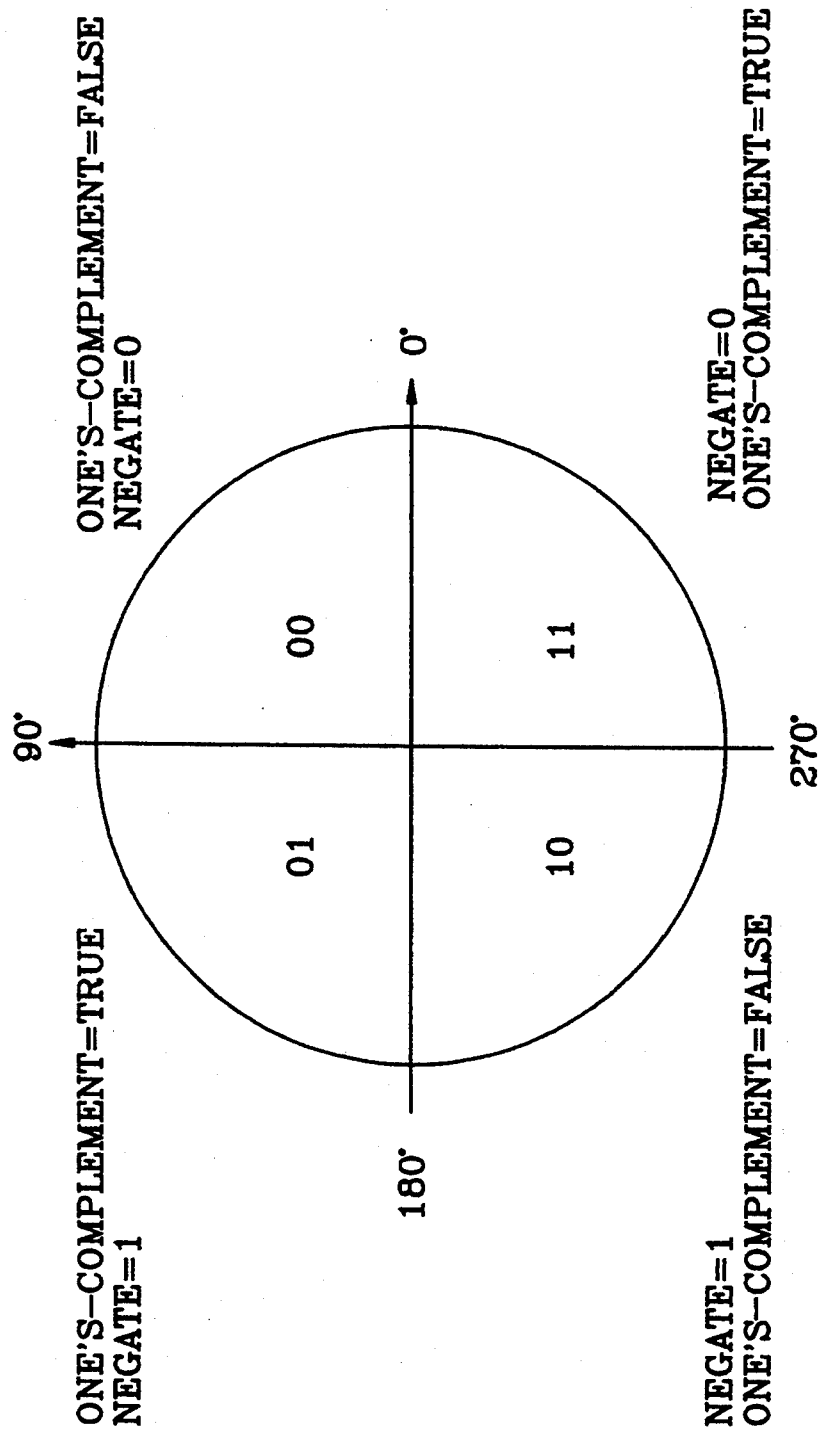
FIG. 2 is a diagram illustrating the operation of the cosine look-up table of FIG. 1

Referring now to FIG. 2 there is shown a phase circle for one complete cycle. The two most significant bits (MSBs) of the 12 bit phase number applied to the LUT represent the quadrant where the phase angle of that number lies. The two MSBs are used to determine whether to apply a negation (a 1's complement) to the output of the LUT or not.

Inside the LUT, the 12-bit phase value is folded into a 10-bit phase value, plus a negate signal, depending on the two Most Significant Bits. This reduces the size of the LUT by a factor of 4. Note that it is only necessary to one's complement the 10 LSBs of the phase number, rather than two's-complementing them. This is because the ROM saves values not of (n * $90°/2^{10}$), where 0 is less than or equal to 1023, but rather of ((2n+1) * $90°/2^{11}$). This makes the table symmetrical about reflections about the x or y-axis. Also, because of the LSB-biased 2's complement format, only 7 bits need to be stored in the LUT.

When the negate bit is asserted, negative values are obtained by one's-complementing the LUT output, making an 8-bit number whose MSB=1. The LSB-biased 2's complement format eliminates the need to do a 2's-complement negation, which requires adding one to the LSB.

Referring again to FIG. 1, the modulator includes a system for digital correction of the transmit/receive frequency. This is embodied in a frequency offset phase generator 1 which calculates the phase correction to be applied to the carrier. The frequency correction is applied by calculating, in response to a detected frequency error present at 1a, the absolute frequency offset at the desired transmit or receive frequency, the nominal value of which is applied at 1b, and dividing this offset by the system clock, which is 4.3 MHz. This gives cycles/sample. As a practical matter, the frequency offset should be limited to a fraction of the modulation bandwidth, otherwise the D/A converter and filter requirements become excessive.

In this example it is necessary to correct the frequency to within ±0.1 ppm of the base station reference. Since the lowest frequency carrier is 890 MHz, this implies a resolution for the frequency offset smaller than 89 Hz. Therefore, given a 4.3 MHz system clock, a 16-bit counter would give sufficient resolution (66 Hz).

The frequency offset phase generator 1 calculates the actual offset to be applied to the 1 MHz carrier, based on the ppm error in the local oscillator, and the actual transmit or receive frequency at the antenna. The equation is frequency offset=ppm error * antenna frequency. An accumulated value is maintained by a frequency offset phase register 10 which feeds back its output to be summed with current changes in an ALU 11. The output from the carrier frequency generator 2 and the frequency offset phase generator 1 are combined in the ALU 3 which digitally sums the numbers at its input. The modulator also includes means for alleviating the frequency spread inherent when a signal burst transmission starts or stops suddenly. To this end there is provided an amplitude modulation module 12 which generates a raised cosine ramp, from 0 to 1, over 3 symbol periods, at the beginning of a burst, then down again at the end. This output is applied via a multiplexer 13 to a multiplier 14, multiplied by the output of the cosine LUT in a multiplier 14 to produce a simultaneously amplitude and phase modulated signal. This signal is then converted to an analog signal. The analog bandpass filter 9 after the DAC is used simultaneously as a reconstruction filter and to reduce broadband noise outside the transmit channel.

Many of the components of the modulator can be used as a demodulator in a receiving mode. In the receiving mode, the output of the modulation phase generator 4 is zeroed, and the frequency corrected carrier is switched between sine and cosine for every received sample. This is done by selecting between the phase and 90° - phase using the trigonometric identity sine $A$ = cosine $[90°-A]$. The two digital outputs representing phase and 90° - phase are available at the output of a switching unit 6, there being a subtracter unit 15 which provides the 90° - phase output. Switching is effected at the sampling frequency via an input 6a. The other input of the multiplier 14 is switched to the output of a receiver A/D converter 16. A filter 17 in front of the A/D converter 16 is a bandpass filter which is used both for anti-aliasing and selectivity. Each sample is therefore mixed down to an In-phase and Quadrature representation at baseband. A digital filter 18 which follows the multiplier rejects the sum frequency output from the mixer (multiplier), and provides the final selectivity filtering before the output is reduced to the symbol frequency of 270.83 kHz. The filter 18 is implemented as a symmetrical FIR filter. This filter, the multiplier, the carrier phase generator, the frequency offset phase generator, and the cosine LUT are reused between the In-phase and Quadrature signals, saving significant amounts of hardware.

The invention is not restricted to the details of the above described embodiment. For example, the cosine calculation need not be effected in a ROM look-up table but may be calculated using a CORDIC (COordinate Rotation Digital Computer, invented by J. E. Volder in 1956, and published as "The Cordic trigonometric computing technique", IRE Transactions on Electronic Computers vol EC-8 No 3 pp 330–334 September 1959). This would be especially suitable if a higher-precision D/A converter is used, because the size of the cosine LUT increases linearly with the precision of the D/A converter.

We claim:

1. A digital radio phase modulator/demodulator comprising a digital carrier phase generator for generating, when operating in a transmit mode of operation, a sequence of intermediate radio frequency phase numbers which together synthesize an intermediate carrier frequency signal; a modulator phase generator which receives digital modulator data symbols and which generates corresponding modulator phase numbers; an arithmetic-logic unit which combines the intermediate radio frequency phase numbers with the modulation phase numbers to produce a sequence of combination phase numbers; a look-up table which determines the sines and/or cosines of the combination phase numbers to give a trigonometric digital output; and a digital to analog convertor for converting the trigonometric digital output to an analog form; said modulator/demodulator further comprising means for generating an intermediate frequency carrier signal from the carrier phase generator, when operating in a receive mode of operation, that is alternately switched with switching means, at a frequency at which a received signal is sampled and converted to a digital signal, between in-phase and quadrature components before application to said look-up table, wherein the output from the look-up table is applied to mixer means whereat the output of said look-up table is mixed digitally with the sampled received signal to generate an in-phase and a quadrature representation at baseband.

2. A radio phase modulator as claimed in claim 1 wherein a single folded sine or cosine table is provided as the look-up table, measures being taken to modify the table input or output in accordance with a quadrant of the angle represented.

3. A digital radio phase modulator comprising a digital carrier phase generator for generating a sequence of IF phase numbers which together synthesize an intermediate carrier frequency signal; a modulator phase generator which receives digital modulator data symbols and which generates corresponding modulator phase numbers; an arithmetic-logic unit which combines the IF phase numbers with the modulation phase numbers to produce a sequence of combination phase numbers; a look-up table which determines the sines and/or cosines of the combination phase numbers to give a trigonometric digital output; and a digital to analog convertor for converting the trigonometric digital output to an analog form; wherein a single folded sine or cosine table provided as the look-up table, measures being taken to modify the table input or output in accordance with a quadrant of the angle represented; and wherein the output of the look-up table is expressed in a half least significant bit biased 1's complement format.

4. A digital radio phase modulator comprising a digital carrier phase generator for generating a sequence of IF phase numbers which together synthesize an intermediate carrier frequency signal; a modulator phase generator which receives digital modulator data symbols and which generates corresponding modulator phase numbers; an arithmetic-logic unit which combines the IF phase numbers with the modulation phase numbers to produce a sequence of combination phase numbers; a look-up table which determines the sines and/or cosines of the combination phase numbers to give a trigonometric digital output; and a digital to analog convertor for converting the trigonometric digital output to an analog form; wherein said modulator is used in a demodulation mode wherein a digital signal is derived from a received radio signal by sampling the received radio signal with an analog-to-digital convertor, wherein the intermediate frequency carrier signal from the carrier phase generator, before being applied to the look-up table, is alternately switched with switching means, at a sampling frequency, between in-phase and quadrature components, wherein the output from the look-up table is applied to mixer means where the output of the look-up table is mixed digitally with the sampled received signal to produce a resultant digital signal which represents alternately sine and cosine of the modulation phase, and wherein the resultant digital signal is applied to an image rejection/selectivity filter.

5. A radio phase modulator as claimed in claim 1 wherein the modulator is used in a burst-type transmission system, and further comprising means for digitally amplitude modulating an output of said look-up table so as to increase the amplitude progressively at the beginning of a burst and to decrease the amplitude progressively at the end of a burst.

6. A radio phase modulator comprising a digital carrier phase generator for generating a sequence of intermediate radio frequency phase numbers which together synthesize an intermediate carrier frequency signal; a modulator phase generator which receives digital modulator data symbols and which generates corresponding modulator phase numbers; an arithmetic-logic unit which combines the intermediate radio frequency phase numbers with the modulation phase numbers to produce a sequence of combination phase numbers; a look-up table which determines the sines and/or cosines of the combination phase numbers to give a trigonometric digital output; and a digital to analog convertor for converting the trigonometric digital output to an analog form, and further comprising:
means for digitally correcting a transmit or a receive frequency, said correcting means comprising in combination,
means, responsive to a determined frequency error and to a nominal frequency offset, for determining an absolute frequency offset to be applied to the intermediate carrier frequency signal; and
means for combining the determined absolute frequency offset with the intermediate radio frequency phase numbers prior to said arithmetic-logic unit combining the intermediate radio frequency phase numbers with the modulation phase numbers.

7. A digital radio phase modulator for use in a burst-type of radio frequency communication system, comprising:
a digital carrier phase generator for generating a sequence of intermediate radio frequency phase numbers which together synthesize an intermediate carrier frequency signal;
a modulator phase generator which receives digital modulator data symbols and which generates corresponding modulator phase numbers;
an arithmetic-logic unit which combines the intermediate radio frequency phase numbers with the modulation phase numbers to produce a sequence of combination phase numbers;
a look-up table which determines the sines and/or cosines of the combination phase numbers to give a trigonometric digital output;
means for digitally amplitude modulating an output of said look-up table with a cosine ramp function over a plurality of data symbol periods so as to increase the amplitude progressively at the beginning of a transmitted burst and to decrease the amplitude progressively at the end of the transmitted burst; and
a digital to analog convertor for converting the amplitude modulated trigonometric digital output to an analog form.

8. A digital radio phase modulator for use in a radio frequency communication system, comprising:
a digital carrier phase generator for generating a sequence of intermediate radio frequency phase numbers which together synthesize an intermediate carrier frequency signal;
means, responsive to a determined frequency error and to a nominal frequency offset, for determining an absolute frequency offset;
means for combining the determined absolute frequency offset with the intermediate radio frequency phase numbers to provide frequency corrected intermediate radio frequency phase numbers;
a modulator phase generator which receives digital modulator data symbols and which generates corresponding modulator phase numbers;
an arithmetic-logic unit which combines the frequency corrected intermediate radio frequency phase numbers with the modulation phase numbers to produce a sequence of combination phase numbers;
a look-up table which determines the sines and/or cosines of the combination phase numbers to give a trigonometric digital output; and
a digital to analog convertor for converting the trigonometric digital output to an analog form.

* * * * *